United States Patent
Hellbergh (10) Patent No.: US 7,654,180 B2
(45) Date of Patent: Feb. 2, 2010

(54) DETERMINATION OF BAND SAW FEEDING SPEED

(75) Inventor: Håkan Hellbergh, Lidköping (SE)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 12/324,402

(22) Filed: Nov. 26, 2008

(65) Prior Publication Data

US 2009/0078103 A1     Mar. 26, 2009

Related U.S. Application Data

(63) Continuation of application No. 11/723,945, filed on Mar. 22, 2007, now abandoned, which is a continuation of application No. 10/470,913, filed as application No. PCT/SE02/00200 on Feb. 5, 2002, now abandoned.

(30) Foreign Application Priority Data

Feb. 5, 2001   (SE) .................... 0100347-4

(51) Int. Cl.
    *B23D 55/08*   (2006.01)
(52) U.S. Cl. ............................. 83/13; 83/800
(58) Field of Classification Search ........... 83/76.6, 83/76.9, 76, 800, 801, 13; 700/173, 179
    See application file for complete search history.

(56) References Cited

U.S. PATENT DOCUMENTS

| | | |
|---|---|---|
| RE26,377 E | 4/1968 | Whitmore |
| 3,592,094 A | 7/1971 | Greenblatt |
| 3,754,490 A | 8/1973 | Sata et al. |
| 4,358,974 A | 11/1982 | Sakurai |
| 4,432,260 A | 2/1984 | Sarurai et al. |
| 4,436,009 A | 3/1984 | Ask |
| 4,437,367 A | 3/1984 | Hauser |
| 4,481,845 A | 11/1984 | Sakurai et al. |
| 4,625,603 A | 12/1986 | Brink |
| 4,644,832 A | 2/1987 | Smith |
| 4,809,200 A | 2/1989 | Moore et al. |
| 4,896,273 A * | 1/1990 | Moore et al. .................. 83/789 |

(Continued)

FOREIGN PATENT DOCUMENTS

GB    2 052 107 A    1/1981

(Continued)

*Primary Examiner*—Stephen Choi
(74) *Attorney, Agent, or Firm*—Buchanan Ingersoll & Rooney (57) ABSTRACT

In a method and a system for determining the feeding speed when bandsaw cutting a workpiece, the tooth pitch TP of the bandsaw blade is determined in a first unit depending on the shape and dimensions of the workpiece. In a second unit feeding depth per tooth is determined depending on properties of the workpiece material and the width of the bandsaw blade. The bandsaw blade velocity BS is determined in a third unit from the width W of the workpiece and the hardness of the workpiece material, whereafter the cutting time T is determined in a first calculating unit from the height H of the workpiece, the feeding depth per tooth, the tooth pitch TP and the blade velocity BS. In a second calculating unit the feeding speed MH for the bandsaw blade is then determined by the equation MH=H/T. A computer program, when executed on a computer, performs this determination of the feeding speed when cutting a workpiece with a bandsaw from supplied input data.

3 Claims, 4 Drawing Sheets

U.S. PATENT DOCUMENTS

| | | | |
|---|---|---|---|
| 5,018,421 A | 5/1991 | Lucki et al. | |
| 5,043,907 A | 8/1991 | Richards | |
| 5,115,403 A | 5/1992 | Yoneda et al. | |
| 6,378,408 B2 | 4/2002 | Smith | |
| 6,382,062 B1 | 5/2002 | Smith | |

FOREIGN PATENT DOCUMENTS

| | | |
|---|---|---|
| GB | 2 055 325 A | 3/1981 |
| GB | 2 121 565 A | 12/1983 |
| JP | 56-027725 A | 3/1981 |

\* cited by examiner

DETERMINATION OF BAND SAW FEEDING SPEED

This application is a continuation of U.S. application Ser. No. 11/723,945 filed on Mar. 22, 2007, which is a continuation of U.S. application Ser. No. 10/470,913 filed on Aug. 1, 2003, now abandoned; and which is the counterpart of International Application No. PCT/SE02/00220 filed on Feb. 5, 2002 claiming priority from Swedish Application No. 0100347-4 filed on Feb. 5, 2001.

BACKGROUND OF THE INVENTION

The present invention concerns a method and a system for determination of the feeding speed when cutting a workpiece by a bandsaw. The invention also concerns a computer program which can be used when employing the method and realizing the system.

Bandsaws are today used to a large extent in industry for cutting of metal bars. It is then of great importance that the cutting data are determined in an optimal way. In this case, cutting data means choice of tool type, such as tooth material and tool geometry, band velocity, tooth pitch, feeding or penetration speed, and cutting time. If non-optimal cutting data are chosen it will result in shorter band durability, non-flat cutting, rough cut surface, tooth fractures, uneconomic cutting, etc.

The most commonly occurring method to determine cutting data in industry today is based on the cross section area of the workpiece. For each material, a suitable cutting speed has been determined from experience. A typical determination of cutting data can today be performed in the following way.

A stainless steel (SS 2343) bar with a diameter of 100 mm is to be cut. Looking in a simple table one can find that SS 2343 should be cut with a cutting speed of 25 to 35 cm$^2$/min. With some effort the minimum cross section of the bar is calculated as A=$\pi r^2$=78 cm$^2$ and the minimum cutting time is then calculated as 78/35 to 78/25=2.23 to 3.24 min. There are certain developed versions of this method—e.g. different cutting speeds can be given depending on the diameter of the bar.

These calculations include weaknesses since a number of factors are omitted, such as the width of the bandsaw blade, the hardness of the workpiece material and the condition of the sawing machine, etc. The most important omission, however, is that there is no reference to the shape of the cross section.

Suppose that a first customer cuts through a 100 mm thick bar, a second customer cuts a tube with 200 mm external diameter and 174 mm internal diameter, and a third customer cuts a slab with 300 mm×38 mm rectangular section. The workpieces of all three customers have the same cross-sectional area of 78 cm$^2$ and would according to the present method of determination be cut with a cutting time of 2.23 to 3.2 min. Obviously, the customers would need a much more improved method of determining the cutting data to be used.

The aim of the present invention is to remedy the above-mentioned disadvantages in determining the cutting data for band sawing.

SUMMARY OF THE INVENTION

The present invention offers a much improved technology, where a major number of relevant quantities are taken into account in determining the optimal cutting data for different types of workpieces and materials.

There are many more or less complicated empirical diagrams for determining the optimal tooth pitch when cutting tubes. According to advantageous embodiments of the present invention, the average value $W_{med}$ of the length of contact between the bandsaw blade and the workpiece being determined by the equation.

$$W_{med}=(2WT+k)/2$$

where WT denotes the wall thickness of the tube and k the length of the chord at the inner wall, after which the tooth pitch is determined from a predetermined table of suitable tooth pitch for different average values $W_{med}$. When cutting bundles of tubes held together the above equation can also be used.

Till now a suitable cutting depth per tooth for various, materials has been determined from experience from sawing with sawblades with a width of 41 mm in solid workpieces. The cutting depth per tooth is typically in the range of 0.003 to 0.007 mm. When other band widths are used, the cutting depth per tooth must be changed to compensate for the changed band stiffness. The cutting data must be adjusted to keep occurring cutting forces within reasonable limits. If for instance each tooth of the bandsaw blade is exposed to a vertical force of 50 N and 10 teeth are in simultaneous engagement with the workpiece, the band will be subjected to a total force of 500 N. For each blade dimension the blade can resist a certain force before it buckles and starts skewed cutting.

Experience has also given knowledge about which bandsaw velocity is appropriate for cutting different materials. According to one advantageous embodiment of the invention the velocity BS of the bandsaw blade is determined by the equation $$BS=EXP^{L-Kw} \cdot HF \cdot SD$$

where L and K are constants, W is the width of the workpiece, HF is a factor determined by the equation $$HF=((Y_3/Y) \cdot x)/(1+x)$$

where Y is the normal hardness value for the material of the workpiece, $Y_3$ actual hardness, x a constant empirically determined for each material, and SD a factor to compensate for surface defects of the workpiece.

The calculations needed for the method according to the invention are preferably done with a computer, and therefore the invention also comprises a computer program which when executed on a computer performs a determination from supplied input data of the feeding speed of a bandsaw when cutting the workpiece according to the method. The system according to the invention can also preferentially be realized by a computer programmed in this way.

BRIEF DESCRIPTION OF THE DRAWINGS

To explain the invention more closely, embodiments of the invention chosen as examples will be described in greater detail with reference to the accompanying drawings on which

DESCRIPTION OF A PREFERRED EMBODIMENT

Figure 1:
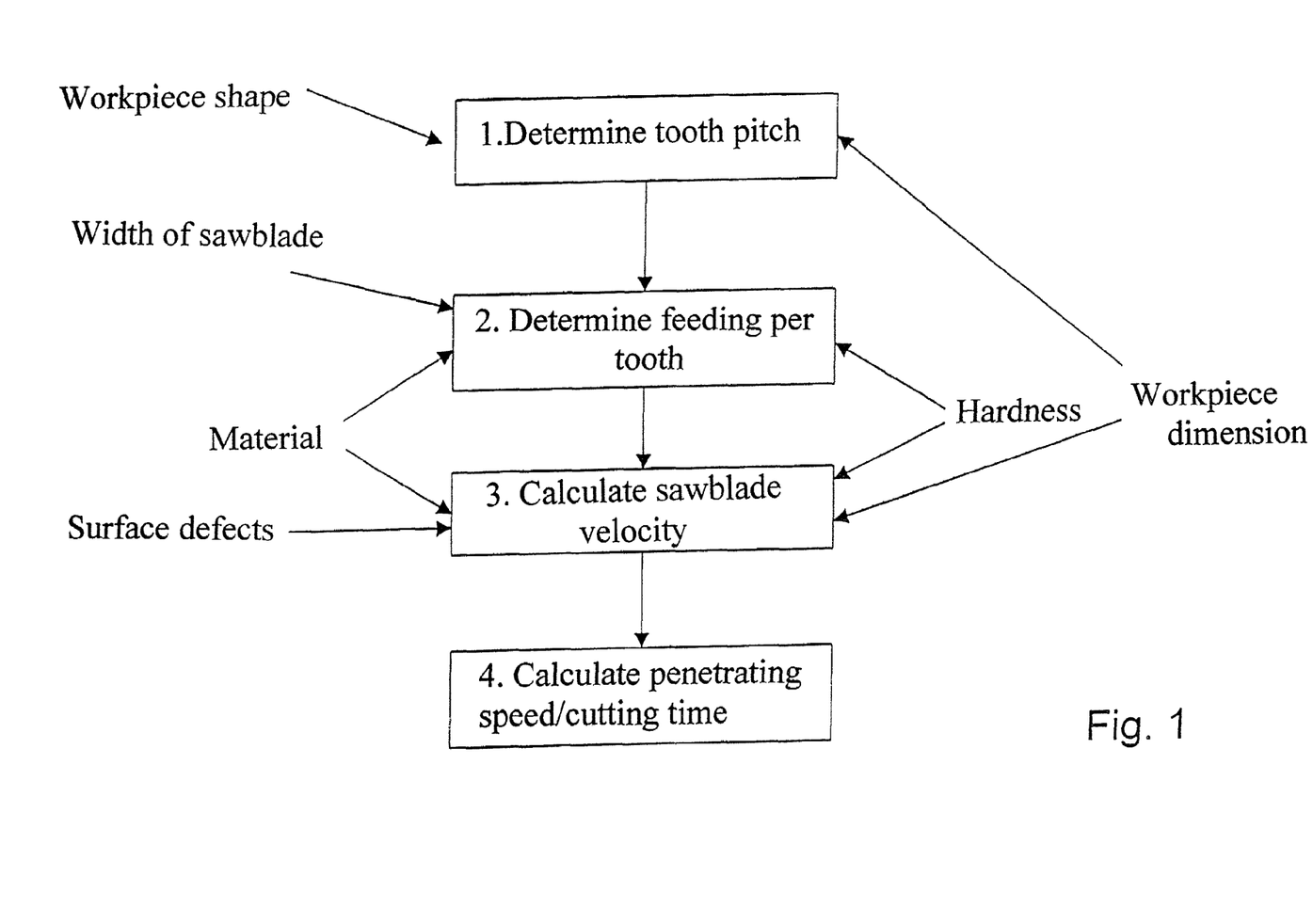
FIG. 1 shows a principal block diagram for the determination of cutting data for bandsaw cutting according to the invention.

In step 1 of FIG. 1 the tooth pitch of the bandsaw blade is determined from the shape and dimensions of the actual workpiece. For solid workpieces the tooth pitch TP is determined according to a table in a per see known manner, e.g. such as

| TP = teeth per inch | Workpiece width |
|---|---|
| 4 | 56-89 mm |
| 3 | 90-120 mm |
| 2 | 121-160 mm |
| etc | |

For tube shaped workpieces there are traditionally more or less complicated empirical diagrams which can be used for determination of the tooth pitch. The present invention, however, comprises a calculation method for determining the tooth pitch for tube shaped workpieces.

Figure 2:
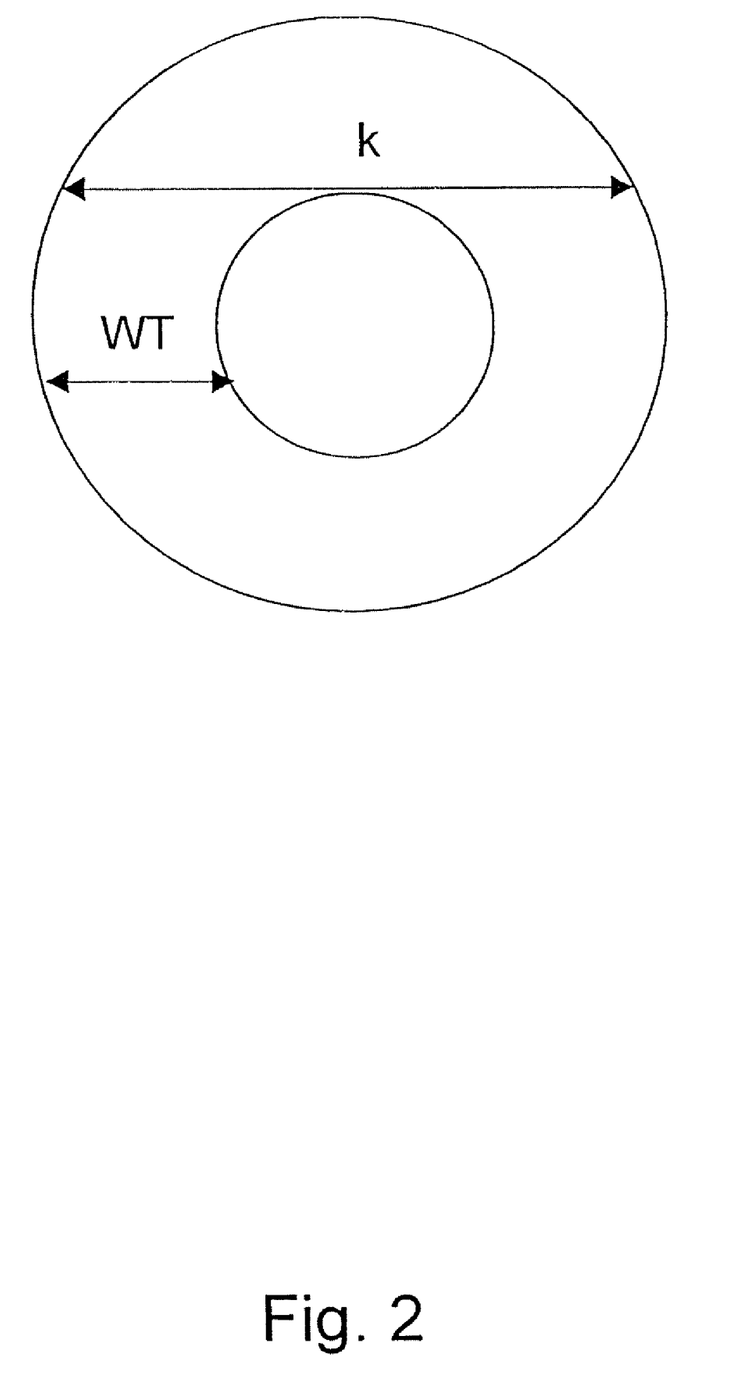
FIG. 2 shows a cross section of a tube shaped workpiece to illustrate the determination of an average cutting width as used according to the invention.

Thus, the shortest cutting length of the bandsaw is geometrically calculated as twice the wall thickness, WT, and the longest engagement length of the bandsaw blade with the tube, i.e., the length of the chord just at the inner wall of the tube, see FIG. 2. The average dimension $W_{med}$ is then calculated according to the equation (1)

$$W_{med} = (2WT + k)/2 \tag{1}$$

The value $W_{med}$ calculated in this manner can then be used to select the tooth pitch, preferably with the aid of the same table as the table mentioned above for solid workpieces.

The above equation can also be used to determine the tooth pitch when a number of tubes bundled together are to be cut.

In step 2 of FIG. 1 the feeding per tooth is determined from the shape and dimensions of the workpiece, from the properties of the material of the workpiece and from the width of the sawblade.

According to the present invention the calculated nominal feeding per tooth is multiplied by a factor $K_2$, empirically determined to compensate for different width of the sawblade. The factor $K_2$ is typically in the range from 0.5 to 2.0.

In step 3 of FIG. 1 the band velocity of the saw is determined. The bandsaw velocity is calculated according to the invention by the equation (2)

$$BS = EXP^{L-K \cdot W} \cdot HF \cdot SD \tag{2}$$

where L and K denote empirically determined constants and W the width of the workpiece. HF denotes a factor which is affected by the hardness of the material of the workpiece according to the equation (3)

$$HF = ((Y_3/Y) \cdot x)/(1+x) \tag{3}$$

where Y denotes the nominal hardness of the material and $Y_3$ the actual hardness, x denotes a constant empirically determined for each material. For soft materials such as low carbon steels x=1.

Figure 3:
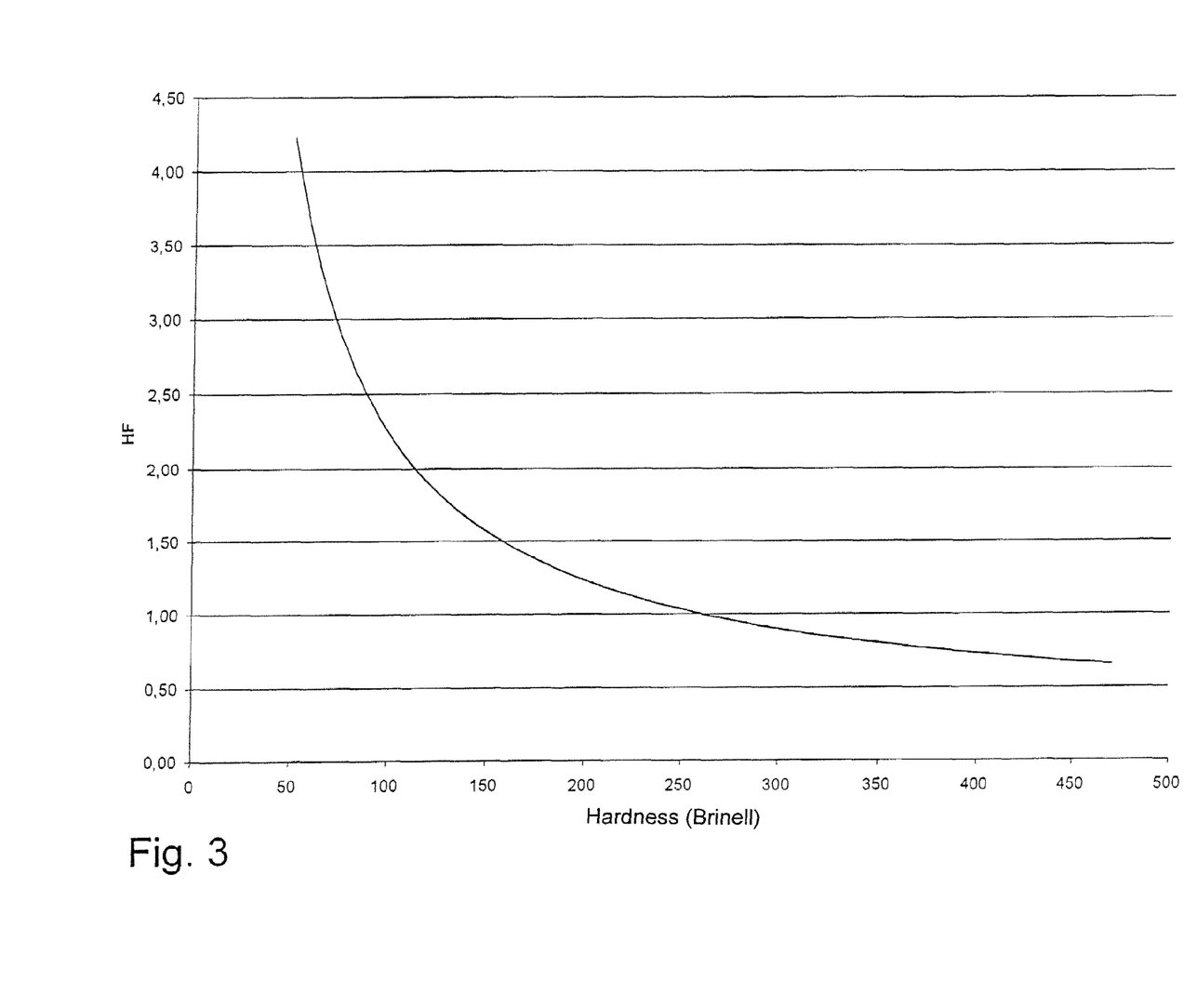
FIG. 3 illustrates the variation of a factor HF taking the hardness of the workpiece material into consideration in determining the bandsaw velocity.

In FIG. 3 is shown the variation of the factor HF as a function of the Brinell hardness of the material. HF=1 occurs for a hardness of about 260, which thus is the normal hardness of this material. For a material with hardness 150 the factor HF increases to approximately 1.5, viz. a higher bandsaw blade velocity BS is permitted.

SD is a factor to compensate for possible surface defects of the workpiece. SD is normally in the range of 0.3 SD=0.3, i.e., the 1, bandsaw velocity BS will then be only 30% of the velocity at a perfect surface.

In step 4 of FIG. 1 is calculated the cutting time T and the feeding or penetrating speed MH.

The cutting time T which is the time required to cut through the workpiece is given by equation (4)

$$T = H \cdot K_2 \cdot K_1 / (39.7 S \cdot HF \cdot TP \cdot BS) \tag{4}$$

where H denotes the height of the workpiece and $K_1$ a factor depending on the tooth pitch which is equal to 1 when the tooth pitch is as recommended and equal to 1.25 if the pitch has been chosen one step shorter than recommended. According to the invention it is permitted to choose a tooth pitch one step longer or one step shorter than recommended. If the recommended pitch is 3 TPI (teeth per inch) one can also accept 4 or 2 TPI, see the table above. If one step shorter pitch is chosen, i.e. 4 TPI, the cutting time T becomes 25% longer, since more teeth will be in contact with the material and cause greater forces. If a longer tooth pitch is chosen, no compensation is needed. Greater deviations from the recommended tooth pitch than one step is not permitted. S denotes the nominal feed per tooth.

The other factors in equation (4) have been defined above.

From the cutting time T and the value of the height of the workpiece the feeding speed MH, viz. the vertical velocity with which the sawblade is lowered, is calculated from equation (5)

$$MH = H/T \tag{5}$$

Figure 4:
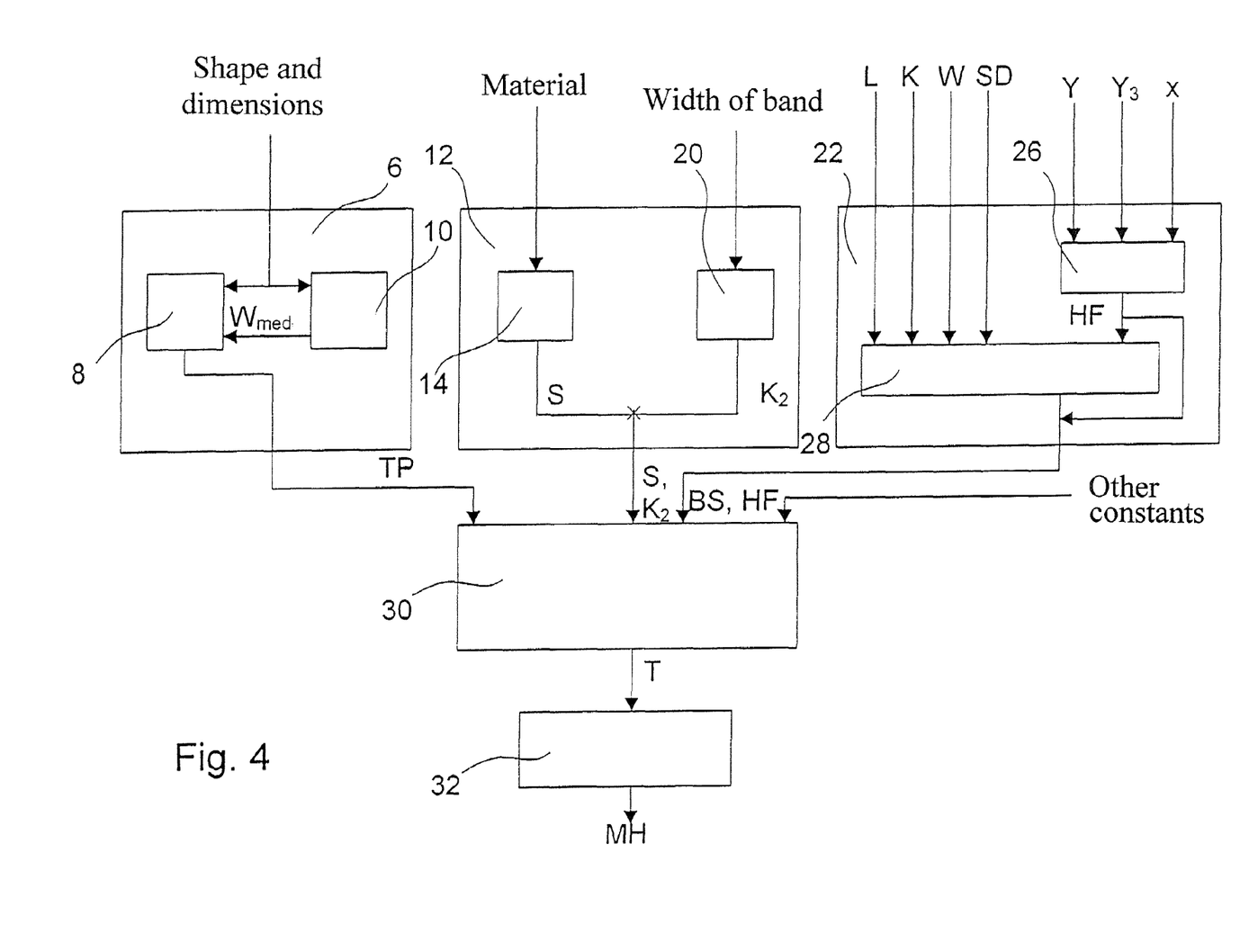
FIG. 4 shows an embodiment of a system according to the invention as a block diagram.

FIG. 4 shows as a block diagram one embodiment of the system according to the invention. The system thus comprises a unit 6 for determining the tooth pitch TP of the bandsaw blade from information about the workpiece shape and dimensions. The unit 6 comprises a memory 8 in which is stored a table of suitable pitch TP for different widths W of the workpiece. The unit 6 also comprises a calculating unit 10 devised to calculate an average $W_{med}$ of the length along which the bandsaw blade is in contact with the material. The average length $W_{med}$ thus described is used to determine suitable tooth pitch TP from said stored table.

The system further comprises a second unit 12 for determination of suitable feed per tooth. In 14 is thus determined a nominal feed per tooth S from data about the material of the workpiece.

At 20 in the unit 12 a factor $K_2$ is determined to compensate for different widths of the bandsaw blade, as described above.

The system also comprises a unit 22 for calculating the bandsaw velocity BS to be used from equation (2) above, from the constants L and K, the factor HF and the factor SD. The unit 22 comprises a calculating unit 26 for calculating the factor HF according to equation (3) above from the hardness values Y and $Y_3$ for the material and the constant x. The calculation of the bandsaw velocity BS is performed in the calculating unit 28.

The cutting time T is then calculated in a calculating unit 30 according to equation (4) above, after which the feeding or penetrating speed MH is calculated according to equation (5) above in a calculating unit 32.

The system described above for determining the feeding speed MH can preferably be realized by a computer programmed to perform the calculations described above.

The invention claimed is:

1. Method for cutting a workpiece with a bandsaw, wherein the tooth pitch TP of the bandsaw blade is determined depending on the shape and dimensions of the workpiece, in that feeding per tooth is determined depending on workpiece material properties and shape and size of the workpiece as well as the saw blade width, in that the bandsaw blade velocity BS is determined from the width and material hardness of the workpiece material, whereafter a cutting time T is determined from the height H of the workpiece, the feeding per tooth, the hardness of the workpiece material, the tooth pitch and the bandsaw blade velocity BS, and in that the feeding speed MH of the bandsaw blade is then determined by the equation $$MH=H/T$$

characterized by the cutting time T being determined by the equation:

$$T=H \cdot K_2 \cdot K_1/(39.7S \cdot HF \cdot TP \cdot BS)$$

where the tooth pitch TP is stated as tooth per inch, $K_1$ is a tooth pitch factor, $K_2$ is an empirically determined factor for compensation for different values of the bandsaw width, and S is the nominal feed per tooth.

2. Method for cutting a workpiece with a bandsaw, wherein the tooth pitch TP of the bandsaw blade is determined depending on the shape and dimensions of the workpiece, in that feeding per tooth is determined depending on workpiece material properties and shape and size of the workpiece as well as the saw blade width, in that the bandsaw blade velocity BS is determined from the width and material hardness of the workpiece material, whereafter a cutting time T is determined from the height H of the workpiece, the feeding per tooth, the hardness of the workpiece material, the tooth pitch and the bandsaw blade velocity BS, and in that the feeding speed MH of the bandsaw blade is then determined by the equation $$MH=H/T$$

said workpiece being tube shaped, wherein an average value $W_{med}$ of the length of contact between the bandsaw blade and the workpiece being determined by the equation $$W_{med}=(2WT+k)/2$$

where WT denotes the wall thickness of the tube and k denotes the length of the chord at the inner wall of the tube, whereafter the tooth pitch TP is determined from a predetermined table of suitable tooth pitch for different average values $W_{med}$.

3. Method according to claim 2, characterized by the same table being used for solid and tube shaped workpieces, said average value $W_{med}$ of the length of contact between the bandsaw blade and the workpiece being used as workpiece width W for tube shaped workpieces.

* * * * *

UNITED STATES PATENT AND TRADEMARK OFFICE
CERTIFICATE OF CORRECTION

PATENT NO. : 7,654,180 B2  
APPLICATION NO. : 12/324402  
DATED : February 2, 2010  
INVENTOR(S) : Håkan Hellberg It is certified that error appears in the above-identified patent and that said Letters Patent is hereby corrected as shown below:

Title Page, under Item (12) United States Patent: change:

Hellbergh" to --Hellberg--.

Title Page, Item (75) Inventor, please change:

"Hellbergh" to --Hellberg--.

Signed and Sealed this

Twelfth Day of October, 2010

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,654,180 B2 | Page 1 of 1 |
| APPLICATION NO. | : 12/324402 | |
| DATED | : February 2, 2010 | |
| INVENTOR(S) | : Hakan Hellbergh | |

It is certified that error appears in the above-identified patent and that said Letters Patent is hereby corrected as shown below:

Title Page, (12), change "Hellberg" to --Hellbergh--.

Title Page, (75) Inventors: change ""Hellberg" to --Hellbergh--.

Signed and Sealed this
Twenty-second Day of November, 2011

David J. Kappos
*Director of the United States Patent and Trademark Office*